(12) United States Patent
Tang (10) Patent No.: US 10,482,879 B2
(45) Date of Patent: Nov. 19, 2019

(54) WAKE-ON-VOICE METHOD AND DEVICE

(71) Applicant: BAIDU ONLINE NETWORK TECHNOLOGY (BEIJING) CO., LTD., Beijing (CN)

(72) Inventor: Liliang Tang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 98 days.

(21) Appl. No.: 15/335,985

(22) Filed: Oct. 27, 2016

(65) Prior Publication Data

US 2017/0206895 A1   Jul. 20, 2017

(51) Int. Cl.
*G10L 15/00* (2013.01)
*G10L 15/16* (2006.01)
(Continued)

(52) U.S. Cl.
CPC ........... *G10L 15/22* (2013.01); *G10L 15/02* (2013.01); *G10L 15/083* (2013.01); *G10L 25/21* (2013.01);
(Continued)

(58) Field of Classification Search
CPC ....... G10L 19/005; G10L 15/02; G10L 15/20; G10L 13/07; G10L 25/90; G10L 25/78; G10L 15/063; G10L 15/065; G10L 15/10; G10L 2015/088; G10L 13/00; G10L 13/06; G10L 15/142; G10L 15/32; G10L 17/04; G10L 19/0212; G10L 19/04; G10L 19/07; G10L 19/12; G10L 2015/025; G10L 25/93; G10L 15/07; G10L 15/083; G10L 15/146;
(Continued)

(56) References Cited

U.S. PATENT DOCUMENTS

| 5,632,002 A * | 5/1997 | Hashimoto | G06F 3/165 704/231 |
| 5,787,389 A * | 7/1998 | Taumi | G10L 19/0018 704/219 |

(Continued)

FOREIGN PATENT DOCUMENTS

| CN | 105096939 A | 11/2015 |
| JP | S61281300 A | 12/1986 |

(Continued)

OTHER PUBLICATIONS

Silaghi, Marius-Calin and Hervé Bourlard. "Iterative Posterior-Based Keyword Spotting Without Filler Models." (1999).*

(Continued)

*Primary Examiner* — Michael Ortiz-Sanchez (74) *Attorney, Agent, or Firm* — Lathrop Gage LLP (57) ABSTRACT

The present invention provides a wake-on-voice method and device. The method includes: obtaining a voice inputted by a user; processing data frames of the voice with a frame skipping strategy and performing a voice activity detection on the data frames by a time-domain energy algorithm; extracting an acoustic feature of the voice and performing a voice recognition on the acoustic feature according to a preset recognition network and an acoustic model; and performing an operation corresponding to the voice if the voice is a preset wake-up word in the preset recognition network.

14 Claims, 5 Drawing Sheets

(51) Int. Cl.
  *G10L 15/22* (2006.01)
  *G10L 15/02* (2006.01)
  *G10L 25/21* (2013.01)
  *G10L 15/08* (2006.01)
(52) U.S. Cl.
  CPC ........ *G10L 15/16* (2013.01); *G10L 2015/027* (2013.01); *G10L 2015/081* (2013.01); *G10L 2015/088* (2013.01); *G10L 2015/223* (2013.01)
(58) Field of Classification Search
  CPC ....... G10L 15/16; G10L 15/22; G10L 15/285; G10L 19/0018; G10L 19/06; G10L 19/08; G10L 19/167; G10L 19/18; G10L 2015/027; G10L 2015/0633; G10L 2015/081; G10L 2015/223; G10L 2021/02166; G10L 2025/783; G10L 2025/906; G10L 21/00; G10L 21/02; G10L 25/09; G10L 25/18; G10L 25/21; G10L 25/48; G10L 25/84; G10L 15/1815; G10L 15/1822; G10L 15/30; G10L 15/08; G10L 15/26
  See application file for complete search history.

(56) References Cited

U.S. PATENT DOCUMENTS

| | | | | |
|---|---|---|---|---|
| 6,310,652 B1* | 10/2001 | Li | ............................. | G10L 21/04 348/515 |
| 6,680,753 B2* | 1/2004 | Kahn | ....................... | G10L 21/01 348/512 |
| 6,957,203 B2* | 10/2005 | Keeler | .................. | G06N 3/0472 706/21 |
| 7,085,716 B1* | 8/2006 | Even | ........................ | G10L 15/22 704/235 |
| 8,260,619 B1* | 9/2012 | Bansal | ..................... | G10L 15/22 704/257 |
| 8,442,821 B1* | 5/2013 | Vanhoucke | .............. | G10L 15/14 704/232 |
| 9,390,708 B1* | 7/2016 | Hoffmeister | ............ | G10L 15/02 |
| 2001/0034601 A1* | 10/2001 | Chujo | ..................... | G10L 25/78 704/233 |
| 2005/0043948 A1* | 2/2005 | Kashihara | .............. | G10L 15/142 704/242 |
| 2008/0162129 A1* | 7/2008 | Cheng | .................... | G10L 15/148 704/231 |
| 2009/0198490 A1* | 8/2009 | Eckhart | ................... | G10L 25/87 704/215 |
| 2010/0121638 A1* | 5/2010 | Pinson | ..................... | G10L 15/02 704/235 |
| 2010/0161335 A1* | 6/2010 | Whynot | ................... | G10L 15/22 704/254 |
| 2011/0166855 A1* | 7/2011 | Vermeulen | .............. | G10L 15/32 704/231 |
| 2013/0158999 A1* | 6/2013 | Maruta | .............. | G01C 21/3608 704/252 |
| 2014/0025379 A1* | 1/2014 | Ganapathiraju | ........ | G10L 15/08 704/255 |
| 2014/0163978 A1* | 6/2014 | Basye | ..................... | G10L 15/28 704/233 |
| 2016/0086600 A1* | 3/2016 | Bauer | ..................... | G10L 15/16 704/202 |
| 2017/0076718 A1* | 3/2017 | Popovici | ............... | G10L 15/187 |
| 2018/0068653 A1* | 3/2018 | Trawick | ................... | G10L 15/02 |

FOREIGN PATENT DOCUMENTS

| | | |
|---|---|---|
| JP | H0713586 A | 1/1995 |
| JP | 2004219918 A | 8/2004 |
| JP | 2004341033 A | 12/2004 |
| JP | 2007079624 A | 3/2007 |
| KR | 20010063844 A | 7/2001 |
| KR | 20090123396 A | 12/2009 |
| WO | WO 2014093238 A1 | 6/2014 |

OTHER PUBLICATIONS

Korean Patent Application No. 2016-0134077 Office Action dated Apr. 18, 2018, 5 pages.
Korean Patent Application No. 2016-0134077 English translation of Office Action dated Apr. 18, 2018, 2 pages.
Japanese Patent Application No. 2017005092 Office Action dated Apr. 3, 2018, 4 pages.
Japanese Patent Application No. 2017005092 English translation of Office Action dated Apr. 3, 2018, 3 pages.
Korean Patent Application No. 2016-0134077 Office Action dated Sep. 29, 2017 with English translation, 7 pages.
"Softmax Layer Approximation for Fast Deep Neural Network Computation", Hoon Chung, et al., *Korea Information Science Society*, pp. 707-709, Dec. 2015.
Chinese Patent Application No. 201610039038.9 Office Action dated Nov. 20, 2018, 8 pages.
Chinees Patent Application No. 201610039038.9 English translation of Office Action dated Nov. 20, 2018, 9 pages.

* cited by examiner

WAKE-ON-VOICE METHOD AND DEVICE

CROSS-REFERENCE TO RELATED APPLICATIONS

This application is based upon and claims priority to Chinese Patent Application Serial No. 201610039038.9, filed on Jan. 20, 2016, the entire content of which is incorporated herein by reference.

FIELD

The present disclosure relates to the voice recognition and process technology, and more particularly to a wake-on-voice method and device.

BACKGROUND

An important branch of voice recognition technology is the wake-on-voice technology which can judge whether a user says a specified wake-up word to start a device by monitoring the user's voices. At present, the wake-on-voice technology has played an important part in fields such as vehicle-mounted system, navigation and smart home, and used to start an application or a service by voice.

The existing wake-on-voice methods mainly rely on a junk word network to realize the wake-on-voice, i.e., the final recognized results may be obtained by selecting some junk words and wake-up words to build a recognition network. A junk word may refer to a word used indiscriminately or excessively.

However, the wake-on-voice technology needs to monitor voices for a long time, i.e., it is required to turn on a recording device and maintain the recording device in an operating and computing condition for a long time. For the existing wake-on-voice technology, the structures of the recognition network and the wake-up network are complicated and the computation burden during the voice activity detection, decoding process or the like is massive, such that the power consumption of device is high and the requirement for long-time monitoring voice cannot be satisfied, thus reducing the processing performance.

SUMMARY

Embodiments of the present disclosure seek to solve at least one of the problems existing in the related art to at least some extent.

Accordingly, a first objective of the present disclosure is to provide a wake-on-voice method. With the method, the processing procedure of wake-on-voice is optimized. On the premise that the wake-up accuracy rate is not reduced, the computation burden and the power consumption of device may be decreased significantly, thus improving the processing performance.

A second objective of the present disclosure is to provide a wake-on-voice device.

In order to achieve the above objectives, embodiments of a first aspect of the present disclosure provide a wake-on-voice method. The method includes: obtaining a voice inputted by a user; processing data frames of the voice with a frame skipping strategy and performing a voice activity detection on the data frames by a time-domain energy algorithm; extracting an acoustic feature of the voice and performing a voice recognition on the acoustic feature according to a preset recognition network and an acoustic model; and performing an operation corresponding to the voice if the voice is a preset wake-up word in the preset recognition network.

With the wake-on-voice method according to embodiments of the present disclosure, a voice inputted by a user is obtained, the data frames of the voice are processed with the frame skipping strategy and the voice activity detection is performed on the data frames by a time-domain energy algorithm; the acoustic feature of the voice is extracted and the voice recognition is performed on the acoustic feature according to a preset recognition network and an acoustic model; and the corresponding operation is performed if the voice is the preset wake-up word in the preset recognition network. In this way, the processing procedure of wake-on-voice is optimized. On the premise that the wake-up accuracy rate is not reduced, the computation burden and the power consumption of device may be decreased significantly, thus improving processing performance.

In order to achieve the above objectives, embodiments of a second aspect of the present disclosure provide a wake-on-voice device. The device includes: an obtaining module, configured to obtain a voice inputted by a user; a voice activity detection module, configured to process data frames of the voice with a frame skipping strategy and to perform a voice activity detection on the data frames by a time-domain energy algorithm; an extracting module, configured to extract an acoustic feature of the voice; a recognizing module, configured to perform a voice recognition on the acoustic feature according to a preset recognition network and an acoustic model; and a processing module, configured to perform an operation corresponding to the voice if the voice is a preset wake-up word in the preset recognition network.

With the wake-on voice device according to embodiments of the present disclosure, by obtaining a voice inputted by a user, processing data frames of the voice with the frame skipping strategy and performing the voice activity detection on the data frames by a time-domain energy algorithm, extracting an acoustic feature of the voice and performing the voice recognition on the acoustic feature according to a preset recognition network and an acoustic model, and performing the corresponding operation if the voice is the preset wake-up word in the preset recognition network, the processing procedure of wake-on-voice is optimized. On the premise that the wake-up accuracy rate is not reduced, the computation burden and the power consumption of the device may be decreased significantly, thus improving processing performance.

BRIEF DESCRIPTION OF THE DRAWINGS

The above and/or additional aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

The wake-on-voice method and device according to embodiments of the present disclosure will be described with reference to drawings.

Figure 1:
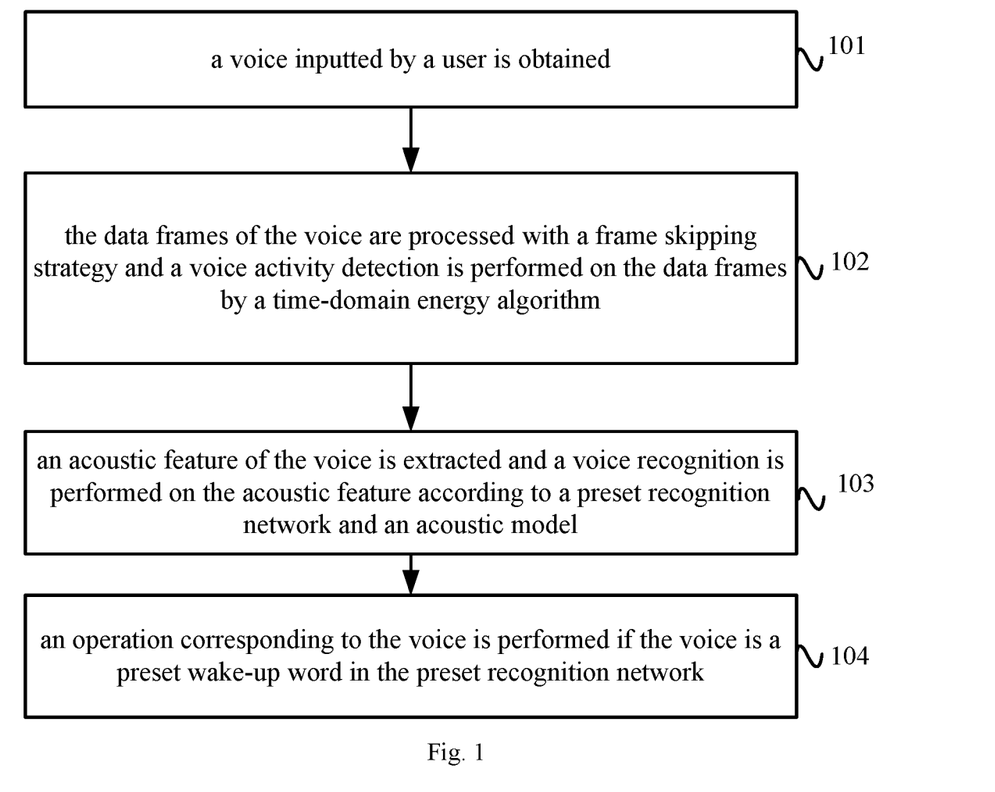
FIG. 1 is a flow chart of a wake-on-voice method according to an embodiment of the present disclosure.

FIG. 1 is a flow chart of a wake-on-voice method according to an embodiment of the present disclosure.

As shown in FIG. 1, the wake-on-voice method includes the following acts.

At block 101, a voice inputted by a user is obtained.

At block 102, data frames of the voice are processed with a frame skipping strategy and a voice activity detection is performed on the data frames by a time-domain energy algorithm.

Specifically, the wake-on-voice method in embodiments of the present disclosure may be applied in a voice recognition system, so as to recognize the voice inputted by a user and determine whether it is a preset wake-up word in a recognition network for performing a corresponding operation.

The user may input the voice through a voice interaction interface, and then the inputted voice may be detected by an optimized voice activity detection (VAD).

To begin with, the data frames of the voice are processed with the frame skipping strategy based on the steady and continuous feature of voice, which can reduce the computation burden compared to an existing technology.

It should be noted that different frame skipping strategies may be used to process data frames of the voice in different application scenarios.

First Example odd frames are processed.

A feature of a $(2n-1)^{th}$ frame of the voice is extracted, such that a feature of a $(2n)^{th}$ frame of the voice may use a processing result of the $(2n-1)^{th}$ frame, where n represents a positive integer.

Alternatively, second example: even frames are processed.

A feature of a $(2n)^{th}$ frame of the voice is extracted, such that a feature of a $(2n-1)^{th}$ frame of the voice may use a processing result of the $(2n)^{th}$ frame, where n represents a positive integer.

Then, the voice activity detection is performed on the data frames by a time-domain energy algorithm.

Compared to the existing technology, the frequency-domain algorithm is not used any more (i.e., FFT is not used), but the time-domain energy algorithm is used merely. Thus, the computation burden of FFT is saved and the power consumption for VAD processing is optimized.

At block 103, an acoustic feature of the voice is extracted and voice recognition is performed on the acoustic feature according to a preset recognition network and an acoustic model.

At block 104, an operation corresponding to the voice is performed if the voice is a preset wake-up word in the preset recognition network.

Specifically, after the voice activity detection is performed on the voice imputed by a user, the acoustic feature of the detected voice information may be extracted.

And then, the voice recognition is performed on the acoustic feature of the user's voice according to a preset recognition network and an acoustic model.

It should be noted that, in order to further save power consumption during the process of voice recognition and wake-on-voice, the preset recognition network and the acoustic model may be optimized according to application requirements, and specific recognizing and processing algorithms may also be optimized, which will be described below emphatically. There are a lot of voice processing algorithms.

For example, the voice recognition may be performed on the acoustic feature by a viterbi algorithm, according to the preset recognition network and the acoustic model.

Further, a corresponding operation may be performed according to recognized results, i.e. a corresponding wake-up operation is performed if the user's voice is recognized as the wake-up word, and the corresponding wake-up operation is not performed if the user's voice is not recognized as the wake-up word.

With the wake-on-voice method according to embodiments of the present disclosure, a voice inputted by a user is obtained, the data frames of the voice are processed with the frame skipping strategy and the voice activity detection is performed on the data frames by a time-domain energy algorithm; the acoustic feature of the voice is extracted and the voice recognition is performed on the acoustic feature according to a preset recognition network and an acoustic model; the corresponding operation is performed if the voice is the preset wake-up word in the preset recognition network. Thus, the processing procedure of wake-on-voice is optimized. On the premise of that the wake-up accuracy rate is not reduced, the computation burden and the power consumption of device may be decreased significantly, thus improving processing performance.

Figure 2:
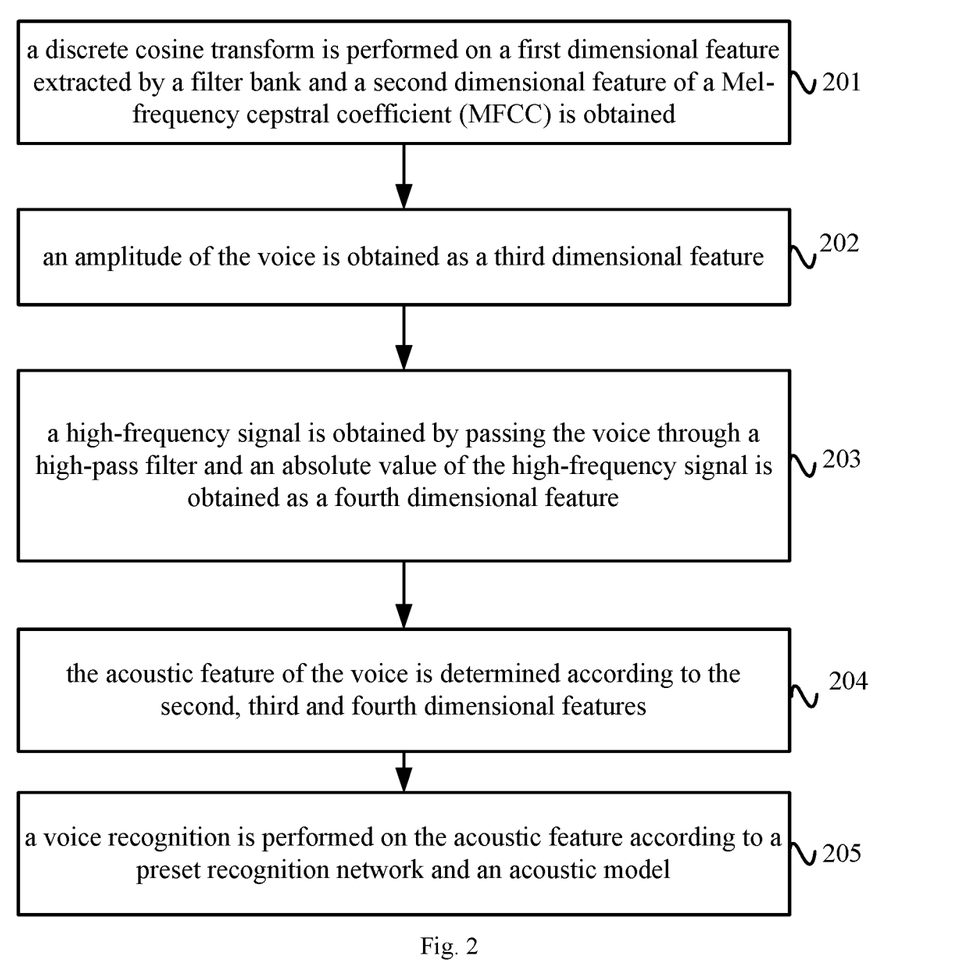
FIG. 2 is a flow chart of a wake-on-voice method according to another embodiment of the present disclosure.

FIG. 2 is a flow chart of a wake-on-voice method according to another embodiment of the present disclosure.

As shown in FIG. 2, the act 103 in FIG. 1 includes the following acts.

At block 201, a discrete cosine transform is performed on a first dimensional feature extracted by a filter bank and a second dimensional feature of a Mel-frequency cepstral coefficient (MFCC) is obtained.

At block 202, an amplitude of the voice is obtained as a third dimensional feature.

At block 203, a high-frequency signal is obtained by passing the voice through a high-pass filter and an absolute value of the high-frequency signal is obtained as a fourth dimensional feature.

At block 204, the acoustic feature of the voice is determined according to the second, third and fourth dimensional features.

At block 205, a voice recognition is performed on the acoustic feature according to a preset recognition network and an acoustic model.

Specifically, in this embodiment, it is aimed to optimize the voice's acoustic feature extracted in the above embodiments, so as to simplify the process of performing the voice recognition on the acoustic feature according to the preset recognition network and the acoustic model.

In the process of extracting the acoustic feature of the voice inputted by a user, generally, a filter bank feature is extracted. However, since the dimension is high, the computation burden in this process is large.

In this embodiment, the discrete cosine transform is performed on the filter bank feature and the dimensional feature of a Mel-frequency cepstral coefficient (MFCC) is obtained. Then, the dimensional feature of the voice's amplitude is obtained, and the high-frequency signal is obtained by passing the voice through the high-pass filter and the dimensional feature of the high-frequency signal is obtained.

Then, the acoustic feature of the voice is extracted after the above processes. In order to illustrate the acoustic feature extraction method in this embodiment more clearly, examples are given as follows.

Assume that a 40 dimensional filter bank feature is extracted after extracting the feature of voice. The present dimension is 40, and a process of obtaining MFCC feature and other features (13+2) used in this embodiment is shown specifically as follow.

1. The discrete cosine transform is performed on the 40 dimensional filter bank feature to obtain 13 dimensional MFCC feature.

2. Two other features need to be obtained next. The loudness (amplitude) of the voice is acted as the $14^{th}$ dimensional feature.

3. Then the voice passes through a high-pass filter with the voice left over as the high-frequency signal. The voice message of human is mostly concentrated in high frequency, such that the logarithmic value of the absolute value of the filtered signal after passing through the high-pass filter is acted as the $15^{th}$ dimensional feature.

Thus, the computation burden of feature extraction computation and subsequent multiplication of matrices multiplying by vectors may be decreased by using the method of reducing the number of features.

Based on the above embodiments, with the wake-on-voice method in this embodiment, the discrete cosine transform is performed on the first dimensional feature extracted by the filter and the second dimensional feature of MFCC is obtained. Then the amplitude of the voice is obtained as the third dimensional feature, the high-frequency signal is obtained by passing the voice through the high-pass filter and the absolute value of the high-frequency signal is obtained as the fourth dimensional feature. The acoustic feature of the voice may be determined according to the second, third and fourth dimensional features and the voice recognition is performed on the acoustic feature according to a preset recognition network and an acoustic model. Thus, the processing procedure of wake-on-voice is optimized. On the premise that the wake-up accuracy rate is not reduced, the computation burden and the power consumption of device may be decreased significantly, thus improving processing performance. Furthermore, the computation burden of feature extraction computation and subsequent multiplication of matrices multiplying by vectors may be decreased by using the method of reducing the number of features, which further decreasing the power consumption.

Figure 3:
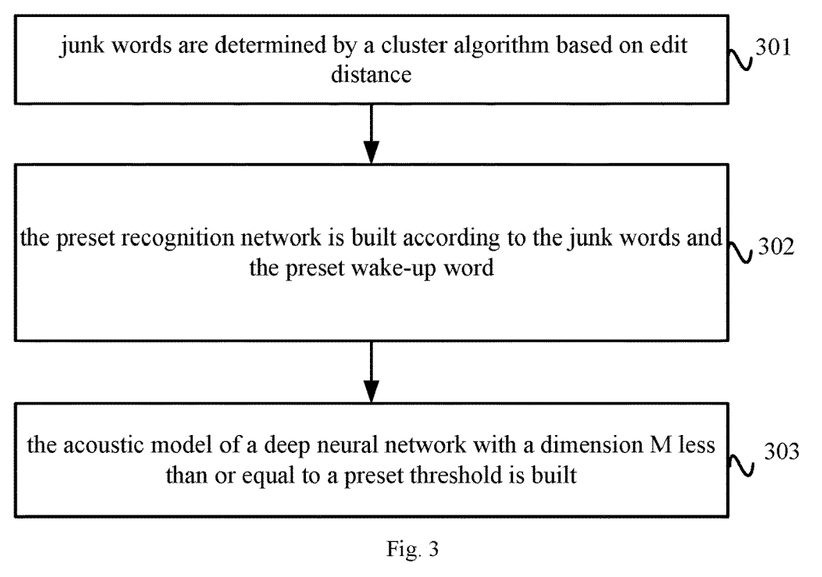
FIG. 3 is a flow chart of a wake-on-voice method according to another embodiment of the present disclosure.

FIG. 3 is a flow chart of a wake-on-voice method according to another embodiment of the present disclosure.

As shown in FIG. 3, before the act 101 in FIG. 1, the following acts are included.

At block 301, junk words are determined by a cluster algorithm based on edit distance.

At block 302, the preset recognition network is built according to the junk words and the preset wake-up word.

Specifically, based on the above embodiments, a recognition network and an acoustic model used for voice recognition should be built before the voice recognition is performed.

The recognition network in this embodiment is a parallel network including wake-up words and junk words, and it is necessary to reduce the number of junk words. In this embodiment, the junk words in the recognition network are reduced by using the cluster algorithm based on edit distance. Thus, the computation burden and the power consumption may be decreased further. Specifically, the number of junk words may be reduced by: connecting all syllables in parallel to form a candidate recognition network; performing a recognition on a preset voice training set according to the candidate recognition network and obtaining recognized results a number of which is greater than a first preset threshold; selecting a plurality of syllables from all the syllables to form a candidate set of syllables according to the recognized results, in which a number of recognized results corresponding to any syllable included in the candidate set is greater than that of recognized results corresponding to each syllable not included in the candidate set; obtaining a syllable A the number of recognized results corresponding to which is highest from the candidate set, saving the syllable A into a junk word set and removing the syllable A from the candidate set; computing an edit distance E between a syllable last saved into the junk word set and each from the candidate set respectively, and saving a syllable Bk between which and the syllable last saved into the junk word set the edit distance is maximum into the junk word set, removing the syllable Bk from the candidate set, and for each syllable in the candidate set, repeating the acts of computing, saving and removing until a number of syllables in the junk word set satisfies a second preset threshold; and configuring the syllables in the junk word set as junk words of the candidate recognition network.

In order to illustrate the above process of optimizing junk words clearly, an example is given as follow. In this example, the original 50 junk words are reduced to 10 words by using the cluster algorithm based on edit distance, such that the size of the built decoding network may be diminished and the efficiency may be improved.

For example, the process of optimizing the original 50 junk words to 10 words without changing the effect may be shown as follow.

In step 1, all syllables are connected in parallel to form a recognition network. The recognized results may be obtained by inputting a lot of voices, and 20 syllables are selected as 20 common junk words according to the recognized results, in which the number of recognized results corresponding to each of the 20 common junk words is in the top 20. Then the 20 common junk words may be used to represent pronunciation sequences formed by all the syllables.

In step 2, 20 common junk words are still too many for the user, so the obtained 20 common junk words need to be further simplified. The syllable A (the number of recognized results corresponding to syllable A is highest) is selected from the 20 common junk words and the other remaining syllables are indicated by B1, B2 . . . B19. The edit distance between syllable A and each of syllables B1, B2 . . . B19 is computed, which may be indicated by E(A B1), E(A B2) . . . E(A Bi), and the syllable Bk who has the maximum edit distance away from syllable A is saved.

Syllables A and Bk are saved and the edit distance between each of 18 remaining syllables (excluding syllables A and Bk from the 20 common junk words) and syllable Bk is computed, and the syllable Bj between which and the syllable Bk the edit distance is maximum is saved, and then the edit distance between each of 17 remaining syllables (excluding syllables A, Bk and Bj from the 20 common junk words) and syllable Bj is computed.

By that analogy, after ten times of computing, the point corresponding to the maximum edit distance (i.e., the best dispersion point) may be obtained. And then the ten junk words are used to test, the difference between the obtained test effect and the test effect obtained by using 50 junk words is insignificant.

Thus, the computation burden of the subsequent viterbi computation may be reduced by using the simplified parallel decoding network with 10 junk words and wake-up words instead of the original parallel decoding network with 50 junk words and wake-up words.

In step 303, the acoustic model of a deep neural network with a dimension M less than or equal to a preset threshold is built.

Specifically, the acoustic model of the deep neural network (DNN) is built in this embodiment and a preset threshold is set for limiting the dimension M of the deep neural network, i.e., M should be less than or equal to the preset threshold. Then, the optimized acoustic model is loaded, in which the dimension of DNN is reduced. The principle of DNN likelihood computation is the matrix manipulation.

For example, assume that the input feature is a vector with dimension A and the neural network is composed of matrixes B1, B2, B3 . . . BN.

The output result of computing process A*B1*B2*B3 . . . BN is a likelihood.

The computation burden of likelihood computation may be reduced effectively by reducing the value of N (i.e., the number of matrixes) and diminishing the size of each matrix therein.

Then, the viterbi decoding is performed on the network in which the junk words are optimized. The power consumption may be decreased by increasing the intensity of clipping (i.e., reducing the number of nodes who are active at the same time).

Based on the above embodiments, in the wake-on-voice method in this embodiment, the amount of junk words in the recognition network and the dimension of the acoustic model are further reduced, such that the recognition network is further simplified and the computation burden of subsequent viterbi computation may be reduced.

Based on the above embodiments, after the voice recognition is performed on the acoustic feature according to the preset recognition network and the acoustic model, the method also includes: stopping the voice recognition according to a preset refusal strategy, such that the failure of wake-up may be determined in time and the viterbi decoding is stopped to reduce the computation burden.

It should be noted that different refusal strategies may be set according to different application scenarios. Another embodiment is shown below with reference to FIG. 4.

Figure 4:
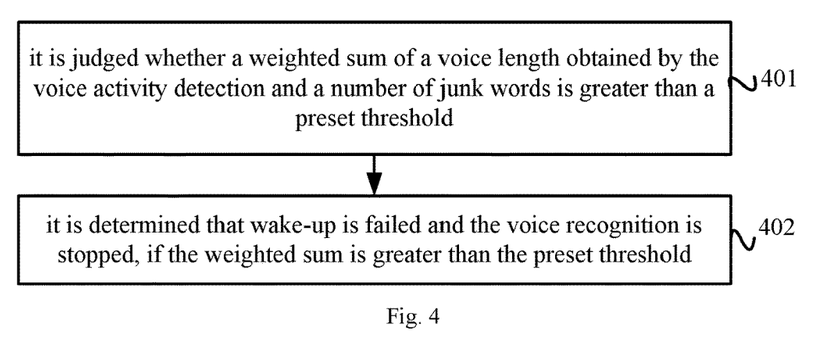
FIG. 4 is a flow chart of a wake-on-voice method according to another embodiment of the present disclosure.

FIG. 4 is a flow chart of a wake-on voice method according to another embodiment of the present disclosure.

As shown in FIG. 4, after the act 103 in FIG. 1, the following acts are included.

At block 401, it is judged whether a weighted sum of a voice length obtained by the voice activity detection and a number of junk words is greater than a preset threshold.

At block 402, it is determined that wake-up is failed and the voice recognition is stopped, if the weighted sum is greater than the preset threshold.

Specifically, in this embodiment, the weighted sum of the voice length obtained by VAD and the number of junk words is acted as a refusal evidence, i.e., if the weighted sum of the voice length and the number of junk words is greater than a threshold, it is determined that the wake-up is failed and the viterbi decoding is stopped, so as to reduce the computation burden. Following formulas may be used in this process.

Score=M*Length+N*GbgCnt; (where Length represents the voice length, and GbgCnt represents the number of junk words, the product of Length and a coefficient M is add to the product of GbgCnt and a coefficient N. M and N are experimental values.)

The voice recognition is stopped if Score>Threshold, where Threshold is a preset threshold.

Based on the above embodiments, with the wake-on voice method in this embodiment, it is judged whether the weighted sum of the voice length obtained by the voice activity detection and the number of junk words is greater than a preset threshold, and if the weighted sum is greater than the preset threshold, the wake-up is determined to be failed and the voice recognition is stopped. Thus, the computation burden of decoding and the power consumption may be reduced and the processing efficiency may be improved.

In order to implement the above embodiments, embodiments of the present disclosure also provide a wake-on voice device.

Figure 5:
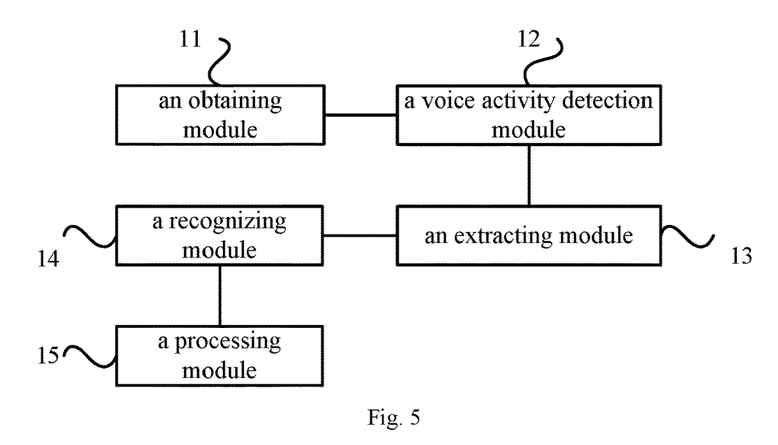
FIG. 5 is a block diagram of a wake-on-voice device according to an embodiment of the present disclosure.

FIG. 5 is a block diagram of a wake-on voice device according to an embodiment of the present disclosure.

As shown in FIG. 5, the wake-on voice device includes: an obtaining module 11, a voice activity detection module 12, an extracting module 13, a recognizing module 14 and a processing module 15.

The obtaining module 11 is configured to obtain a voice inputted by a user.

The voice activity detection module 12 is configured to process data frames of the voice with a frame skipping strategy and to perform voice activity detection on the data frames by a time-domain energy algorithm.

Specifically, the voice activity detection module 12 is configured to: extract a feature of a $(2n-1)^{th}$ frame of the voice and apply a processing result of the $(2n-1)^{th}$ frame in a feature of a $(2n)^{th}$ frame of the voice, wherein n represents a positive integer; or extract a feature of a $(2n)^{th}$ frame of the voice and apply a processing result of the $(2n)^{th}$ frame in a feature of a $(2n-1)^{th}$ frame of the voice, wherein n represents a positive integer.

The extracting module 13 is configured to extract an acoustic feature of the voice.

The recognizing module 14 is configured to perform voice recognition on the acoustic feature according to a preset recognition network and an acoustic model.

Specifically, the recognizing module 14 is configured to: perform the voice recognition on the acoustic feature by a viterbi algorithm according to the preset recognition network and the acoustic model.

The processing module 15 is configured to perform an operation corresponding to the voice if the voice is a preset wake-up word in the preset recognition network.

It should be noted that, the illustration in the above embodiments of the wake-on voice method is also suitable for illustrating the wake-on voice device, which is not described herein.

With the wake-on voice device in this embodiment, a voice inputted by the user is obtained, the data frames of the voice are processed with the frame skipping strategy and the voice activity detection is performed on the data frames by the time-domain energy algorithm; the acoustic feature of the voice is extracted and the voice recognition is performed on the acoustic feature according to a preset recognition network and an acoustic model; the corresponding operation is performed if the voice is the wake-up word in the preset recognition network. Thus, the processing procedure of wake-on voice is optimized. On the premise that the wake-up accuracy rate is not reduced, the computation burden and the power consumption of the device may be decreased significantly, and the processing performance may be improved.

Figure 6:
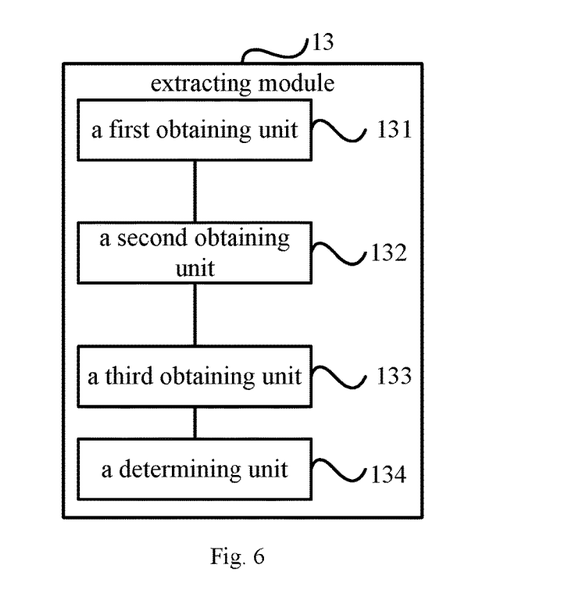
FIG. 6 is a block diagram of a wake-on-voice device according to another embodiment of the present disclosure.

FIG. 6 is a block diagram of a wake-on-voice device according to another embodiment of the present disclosure. As shown in FIG. 6, based on the embodiment illustrated in FIG. 5, the extracting module 13 comprises: a first obtaining unit 131, configured to perform a discrete cosine transform on a first dimensional feature extracted by a filter bank and to obtain a second dimensional feature of a Mel-frequency cepstral coefficient; a second obtaining unit 132, configured to obtain an amplitude of the voice as a third dimensional feature; a third obtaining unit 133, configured to obtain a high-frequency signal by passing the voice through a high-pass filter and to obtain an absolute value of the high-frequency signal as a fourth dimensional feature; a determining unit 134, configured to determine the acoustic feature of the voice according to the second, third and fourth dimensional features.

It should be noted that, the illustration in the above embodiments of the wake-on voice method is also suitable for illustrating the wake-on voice device, which is not described herein.

With the wake-on voice device in this embodiment, the discrete cosine transform is performed on the first dimensional feature extracted by the filter bank and the second dimensional feature of MFCC is obtained; the amplitude of the voice is obtained as the third dimensional feature, the high-frequency signal is obtained by passing the voice through the high-pass filter and the absolute value of the high-frequency signal is obtained as the fourth dimensional feature; the acoustic feature of the voice may be determined according to the second, third and fourth dimensional features and the voice recognition is performed on the acoustic feature according to a preset recognition network and an acoustic model. Thus, the processing procedure of wake-on voice is optimized. On the premise that the wake-up accuracy rate is not reduced, the computation burden and the power consumption of the device may be decreased significantly, and the processing performance may be improved. Furthermore, the computation burden of feature extraction computation and subsequent multiplication of matrices multiplying by vectors may be decreased by using the method of reducing the number of features. As a result, the processing power consumption may be reduced further.

Figure 7:
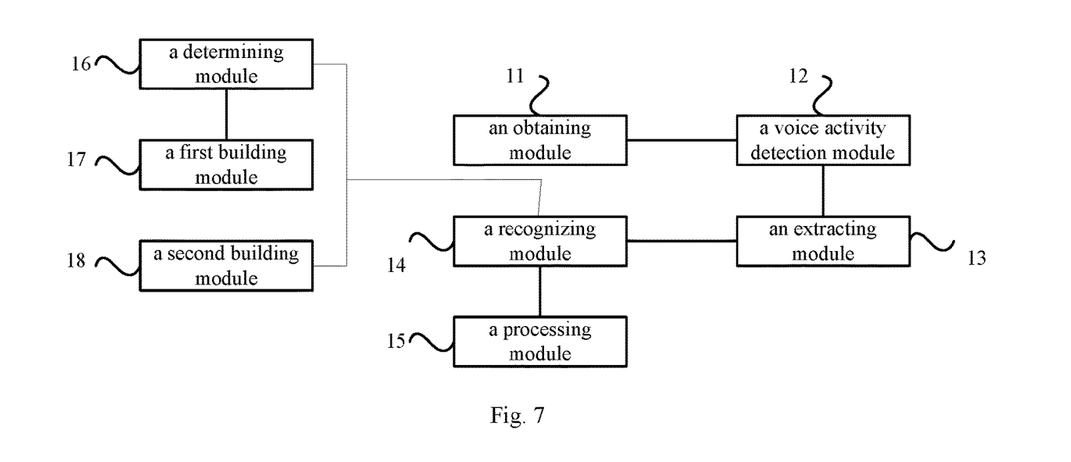
FIG. 7 is a block diagram of a wake-on-voice device according to another embodiment of the present disclosure.

FIG. 7 is a block diagram of a wake-on-voice device according to another embodiment of the present disclosure. As shown in FIG. 7, based on the above embodiments, taking the embodiment illustrated in FIG. 5 as an example, the device further includes: a determining module 16, a first building module 17, and a second building module 18.

The determining module 16 is configured to determine junk words by a cluster algorithm based on edit distance.

In one embodiment, the determining module 16 is configured to: connect all syllables in parallel to form a candidate recognition network; perform a recognition on a preset voice training set according to the candidate recognition network and obtain recognized results of which a number is greater than a first preset threshold; select a plurality of syllables from all the syllables to form a candidate set of syllables according to the recognized results, in which a number of recognized results corresponding to any syllable included in the candidate set is greater than that of recognized results corresponding to each syllable not included in the candidate set; obtain a syllable A the number of recognized results corresponding to which is highest from the candidate set, save the syllable A into a junk word set and remove the syllable A from the candidate set; compute an edit distance E between a syllable last saved into the junk word set and each from the candidate set respectively, and save a syllable Bk between which and the syllable last saved into the junk word set the edit distance is maximum into the junk word set, remove the syllable Bk from the candidate set, and for each syllable in the candidate set, repeat the acts of computing, saving and removing until a number of syllables in the junk word set satisfies a second preset threshold; and configure the syllables in the junk word set as junk words of the candidate recognition network.

The first building module 17 is configured to build the preset recognition network according to the junk words and the preset wake-up word.

The second building module 18 is configured to build an acoustic model of a deep neural network with a dimension M less than a second preset threshold.

It should be noted that, the illustration in the above embodiments of the wake-on voice method is also suitable for illustrating the wake-on voice device, which is not described herein.

With the wake-on voice device in this embodiment, the amount of junk words in the recognition network and the dimension of the acoustic model are further reduced. Thus, the recognition network is further simplified and the computation burden of subsequent viterbi computation may be reduced.

Figure 8:
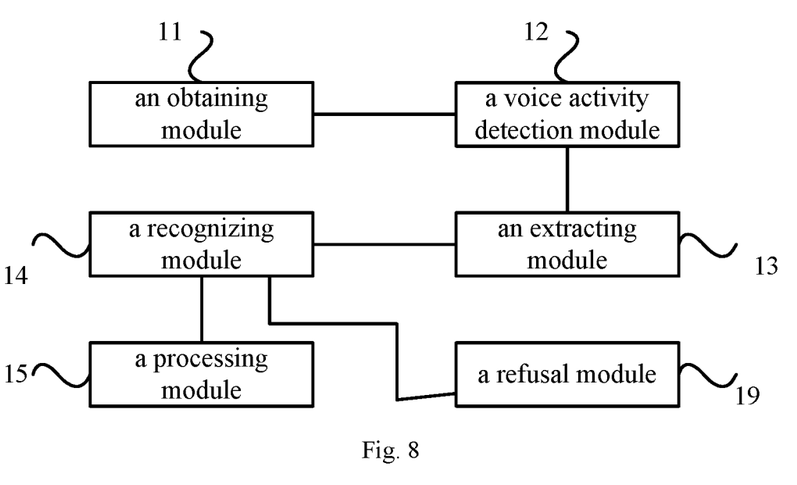
FIG. 8 is a block diagram of a wake-on-voice device according to another embodiment of the present disclosure.

FIG. 8 is a block diagram of a wake-on voice device according to another embodiment of the present disclosure. As shown in FIG. 8, based on the above embodiments, taking the embodiment illustrated in FIG. 5 as an example, the device further includes: a refusal module 19, configured to stop the voice recognition according to a preset refusal strategy.

In one embodiment, the refusal module 19 is configured to: judge whether a weighted sum of the voice length obtained by the voice activity detection and a number of junk words is greater than a third preset threshold; and determine that wake-up is failed and stop the voice recognition if the weighted sum is greater than the third preset threshold.

It should be noted that, the illustration in the above embodiments of the wake-on voice method is also suitable for illustrating the wake-on voice device, which is not described herein.

With the wake-on voice device in this embodiment, it is judged whether the weighted sum of the voice length obtained by the voice activity detection and the number of junk words is greater than a preset threshold, and if the weighted sum is greater than the preset threshold, the wake-up is determined to be failed and the voice recognition is stopped. Thus, the computation burden of decoding and the power consumption may be reduced and the processing efficiency may be improved.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A wake-on-voice method, comprising:
   obtaining a voice inputted by a user;
   processing data frames of the voice with a frame skipping strategy and performing a voice activity detection on the data frames through a time-domain energy algorithm;
   extracting an acoustic feature of the voice and performing a voice recognition on the acoustic feature according to a preset recognition network and an acoustic model; and
   performing an operation corresponding to the voice if the voice is a preset wake-up word in the preset recognition network;
   stopping the voice recognition according to a preset refusal strategy via:
      judging whether a weighted sum of a voice length obtained by the voice activity detection and a number of junk words is greater than a fourth preset threshold, and
      determining that wake-up is failed and stopping the voice recognition, when the weighted sum is greater than the fourth preset threshold,
   determining junk words by a cluster algorithm based on edit distance, comprising:
      connecting all syllables in parallel to form a candidate recognition network;

performing a recognition on a preset voice training set according to the candidate recognition network and obtaining recognized results, wherein a number of the recognized results is greater than a first preset threshold;

selecting a plurality of syllables from all the syllables to form a candidate set of syllables according to the recognized results, wherein a number of recognized results corresponding to any syllable included in the candidate set is greater than that of recognized results corresponding to each syllable not included in the candidate set;

obtaining a first syllable from the number of recognized results, the first syllable corresponding to a largest number of recognized results from the candidate set, saving the first syllable into a junk word set and removing the first syllable from the candidate set;

(i) computing an edit distance between a syllable last saved into the junk word set and from each remaining syllable of the candidate set respectively, (ii) saving a syllable Bk into the junk word set, the syllable Bk having a maximum edit distance between the syllable Bk and the first syllable, and (iii) removing the syllable Bk from the candidate set, and iteratively for each remaining syllable in the candidate set, repeating the acts of (i) computing, (ii) saving, and (iii) removing until a number of syllables in the junk word set satisfies a second preset threshold; and configuring the syllables in the junk word set as the junk words of the candidate recognition network.

2. The method according to claim 1, wherein processing data frames of the voice with a frame skipping strategy comprises:

extracting a feature of a $(2n-1)^{th}$ frame of the voice and applying a processing result of the $(2n-1)^{th}$ frame in a feature of a $(2n)^{th}$ frame of the voice, where n represents a positive integer.

3. The method according to claim 1, wherein processing data frames of the voice with a frame skipping strategy comprises:

extracting a feature of a $(2n)^{th}$ frame of the voice and applying a processing result of the $(2n)^{th}$ frame in a feature of a $(2n-1)^{th}$ frame of the voice, where n represents a positive integer.

4. The method according to claim 1, wherein extracting an acoustic feature of the voice comprises:

performing a discrete cosine transform on a first feature extracted by a filter bank so as to obtain a second feature of a Mel-frequency cepstral coefficient;

obtaining an amplitude of the voice as a third feature;

obtaining a high-frequency signal by passing the voice through a high-pass filter and obtaining an absolute value of the high-frequency signal as a fourth feature; and determining the acoustic feature of the voice according to the second, third and fourth features.

5. The method according to claim 1, wherein performing a voice recognition on the acoustic feature according to a preset recognition network and an acoustic model comprises:

performing the voice recognition on the acoustic feature by a viterbi algorithm, according to the preset recognition network and the acoustic model.

6. The method according to claim 1, further comprising: building the preset recognition network according to the junk words and the preset wake-up word.

7. The method according to claim 1, further comprising: building an acoustic model of a deep neural network, in which a dimension M of the deep neural network is less than or equal to a third preset threshold.

8. A wake-on voice device, comprising:

a processor; and a memory configured to store an instruction executable by the processor;

wherein the processor is configured to:

obtain a voice inputted by a user, process data frames of the voice with a frame skipping strategy and to perform a voice activity detection on the data frames through a time-domain energy algorithm, extract an acoustic feature of the voice, perform a voice recognition on the acoustic feature according to a preset recognition network and an acoustic model, perform an operation corresponding to the voice if the voice is a preset wake-up word in the preset recognition network, and stop the voice recognition according to a preset refusal strategy, by acts of:

judging whether a weighted sum of a voice length obtained by the voice activity detection and a number of junk words is greater than a fourth preset threshold; and determining that wake-up is failed and stop the voice recognition, if the weighted sum is greater than the fourth preset threshold, determine the junk words by a cluster algorithm based on edit distance, by acts of:

connecting all syllables in parallel to form a candidate recognition network;

performing a recognition on a preset voice training set according to the candidate recognition network and obtaining recognized results, wherein a number of the recognized results is greater than a first preset threshold;

selecting a plurality of syllables from all the syllables to form a candidate set of syllables according to the recognized results, wherein a number of recognized results corresponding to any syllable included in the candidate set is greater than that of recognized results corresponding to each syllable not included in the candidate set;

obtaining a first syllable from the number of recognized results, the first syllable corresponding to a largest number of recognized results from the candidate set, saving the first syllable into a junk word set and removing the first syllable from the candidate set;

(i) computing an edit distance between a syllable last saved into the junk word set and from each remaining syllable of the candidate set respectively, (ii) saving a syllable Bk into the junk word set, the syllable Bk having a maximum edit distance between the syllable Bk and the first syllable, and (iii) removing the syllable Bk from the candidate set, and iteratively for each remaining syllable in the candidate set, repeating the acts of (i) computing, (ii) saving, and (iii) removing until a number of syllables in the junk word set satisfies a second preset threshold; and configuring the syllables in the junk word set as the junk words of the candidate recognition network.

9. The device according to claim 8, wherein the processor is configured to process data frames of the voice with a frame skipping strategy, by acts of:
  extracting a feature of a $(2n-1)^{th}$ frame of the voice and applying a processing result of the $(2n-1)^{th}$ frame in a feature of a $(2n)^{th}$ frame of the voice, where n represents a positive integer.

10. The device according to claim 8, wherein the processor is configured to extract an acoustic feature of the voice, by acts of:
  performing a discrete cosine transform on a first feature extracted by a filter bank so as to obtain a second feature of a Mel-frequency cepstral coefficient;
  obtaining an amplitude of the voice as a third feature;
  obtaining a high-frequency signal by passing the voice through a high-pass filter and obtaining an absolute value of the high-frequency signal as a fourth feature;
  determining the acoustic feature of the voice according to the second, third and fourth features.

11. The device according to claim 8, wherein the processor is configured to perform a voice recognition on the acoustic feature according to a preset recognition network and an acoustic model, by an act of:
  performing the voice recognition on the acoustic feature by a viterbi algorithm, according to the preset recognition network and the acoustic model.

12. The device according to claim 8, wherein the processor is further configured to:
  build the preset recognition network according to the junk words and the preset wake-up word.

13. The device according to claim 8, wherein the processor is further configured to:
  build an acoustic model of a deep neural network, in which a dimension M of the deep neural network is less than or equal to a third preset threshold.

14. A non-transitory computer-readable storage medium, having stored therein instructions that, when executed by one or more processors of a device, causes the device to perform a method, wherein the method comprises:
  obtaining a voice inputted by a user;
  processing data frames of the voice with a frame skipping strategy and performing a voice activity detection on the data frames by a time-domain energy algorithm;
  extracting an acoustic feature of the voice and performing a voice recognition on the acoustic feature according to a preset recognition network and an acoustic model;
  performing an operation corresponding to the voice if the voice is a preset wake-up word in the preset recognition network; and,
  stopping the voice recognition according to a preset refusal strategy via:
    judging whether a weighted sum of a voice length obtained by the voice activity detection and a number of junk words is greater than a fourth preset threshold, and
    determining that wake-up is failed and stopping the voice recognition, when the weighted sum is greater than the fourth preset threshold,
  determining the junk words by a cluster algorithm based on edit distance, comprising:
    connecting all syllables in parallel to form a candidate recognition network;
    performing a recognition on a preset voice training set according to the candidate recognition network and obtaining recognized results, wherein a number of the recognized results is greater than a first preset threshold;
    selecting a plurality of syllables from all the syllables to form a candidate set of syllables according to the recognized results, wherein a number of recognized results corresponding to any syllable included in the candidate set is greater than that of recognized results corresponding to each syllable not included in the candidate set;
    obtaining a first syllable from the number of recognized results, the first syllable corresponding to a largest number of recognized results from the candidate set, saving the first syllable into a junk word set and removing the first syllable from the candidate set;
    (i) computing an edit distance between a syllable last saved into the junk word set and from each remaining syllable of the candidate set respectively, (ii) saving a syllable Bk into the junk word set, the syllable Bk having a maximum edit distance between the syllable Bk and the first syllable, and (iii) removing the syllable Bk from the candidate set, and
    iteratively for each remaining syllable in the candidate set, repeating the acts of (i) computing, (ii) saving, and (iii) removing until a number of syllables in the junk word set satisfies a second preset threshold; and
    configuring the syllables in the junk word set as junk words of the candidate recognition network.

* * * * *